United States Patent
Wolfe et al.

(10) Patent No.: US 12,216,684 B2
(45) Date of Patent: Feb. 4, 2025

(54) CLUSTER-BASED DATASET EVOLUTION

(71) Applicant: Capital One Services, LLC, McLean, VA (US)

(72) Inventors: Nathan Wolfe, Silver Spring, MD (US); Purva Shanker, Arlington, VA (US); Joshua Edwards, Philadelphia, PA (US); Gang Mei, Ellicott City, MD (US)

(73) Assignee: Capital One Services, LLC, McLean, VA (US)

( * ) Notice: Subject to any disclaimer, the term of this patent is extended or adjusted under 35 U.S.C. 154(b) by 147 days.

(21) Appl. No.: 17/821,030

(22) Filed: Aug. 19, 2022

(65) Prior Publication Data
US 2024/0061867 A1   Feb. 22, 2024

(51) Int. Cl.
*G06F 16/28*   (2019.01)
*G06N 20/20*   (2019.01)

(52) U.S. Cl.
CPC ........... *G06F 16/285* (2019.01); *G06N 20/20* (2019.01)

(58) Field of Classification Search
None
See application file for complete search history.

(56) References Cited

U.S. PATENT DOCUMENTS

| | | | |
|---|---|---|---|
| 2023/0032208 A1* | 2/2023 | Kobren | G06F 18/214 |
| 2023/0274152 A1* | 8/2023 | Kovalets | G06N 3/088 |
| | | | 706/15 |
| 2023/0342426 A1* | 10/2023 | Kramer | G06F 18/24143 |

* cited by examiner

*Primary Examiner* — Dawaune A Conyers
(74) *Attorney, Agent, or Firm* — Foley & Lardner LLP

(57) ABSTRACT

A method includes obtaining a first dataset associated with a first set of classes and a second dataset associated with a second set of classes, where the first and second datasets share features. The method also includes creating an aggregated dataset having a quality score for the second set of classes that satisfy a first threshold. Creating the aggregated dataset includes determining a first and second set of clusters based on the first and second datasets. The method includes determining a distance based on a record of the first set of clusters and a second record of the second set of clusters in a feature space. The method further includes determining a set of analysis scores based on the distance and generating an indication for a set of records associated with the set of analysis scores based on the set of analysis scores satisfying a second threshold.

19 Claims, 4 Drawing Sheets

CLUSTER-BASED DATASET EVOLUTION

BACKGROUND

A supervised machine learning model can use training data to generate predictions for various applications. The training data may include records labeled with one or more classes. A computer system is capable of using the training data to train a machine learning model to label other records. The computer system may then use the trained machine learning model to perform various types of operations, such as using the trained machine learning model to assign one or more classes to a string of text.

SUMMARY

Training data is the lifeblood of many machine learning models and is critical in ensuring that a machine learning model provides accurate and useful predictions. The training data may be used for training, validating, and monitoring a machine learning model. In many cases, training data may grow less useful over time due to various factors, such as changes in language, new goals for an application, etc. As new classes are added to a dataset, a previously labeled set of records may be inadequate to serve future needs. Manual relabeling of training data may become functionally impossible as the training data itself grows, which may often leave large volumes of useful data unused or cause repetitive training operations.

Some embodiments may overcome this technical problem by evolving a dataset as additional data becomes available. Some embodiments may obtain a first dataset used to train a first machine learning model, where the first machine learning model may be configured to generate class predictions from a first set of classes. Each record of the first dataset may be labeled with at least one class of the first set of classes, and the first dataset may have a first data quality score for the first set of classes that satisfies a data quality threshold. Some embodiments may then obtain a second dataset that includes features that are shared with the first dataset, where each record of the second dataset is labeled with at least one class of a second set of classes. At least one record of the second dataset may be labeled with a new class included in the second set of classes and not included in the first set of classes. Some embodiments may then create an aggregated dataset from the first dataset and the second dataset. The aggregated dataset may be used for training a second machine learning model configured to generate class predictions that may include the first set of classes and the second set of classes. The aggregated dataset may have a second data quality score for the second set of classes that satisfy the data quality threshold.

Some embodiments may create the aggregated dataset from the first dataset and the second dataset by performing a set of dataset integration operations. The set of dataset integration operations may include determining a first set of clusters of records in the first dataset, where each cluster of records of the first set of clusters is labeled with a respective class of the first set of classes. The set of dataset integration operations may also include determining a second set of clusters of records in the second dataset based on the second dataset, wherein each cluster of the second set of clusters is labeled a respective class of the second set of classes. The set of dataset integration operations may also include determining a set of clustering analysis scores based on distances between records of a first cluster of the first set of clusters and records of a second cluster of the second set of clusters in a feature space of the shared features. The set of dataset integration operations may also include generating a relabeling indication for a set of records of the first dataset associated with the set of clustering analysis scores in response to a determination that the set of clustering analysis scores satisfies a class update threshold. Some embodiments may then automatically relabel the set of records based on a class of the second cluster or permit a user to quickly confirm relabeling based on a recommended set of classes, which may include the second class or a synthesized class that is determined based on the second class.

Various other aspects, features, and advantages will be apparent through the detailed description of this disclosure and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion," refers to a part of, or the entirety of (i.e., the entire portion), a given item (e.g., data) unless the context clearly dictates otherwise. Furthermore, a "set" may refer to a singular form or a plural form, such as that a "set of items" may refer to one item or a plurality of items.

DETAILED DESCRIPTION

Figure 1:
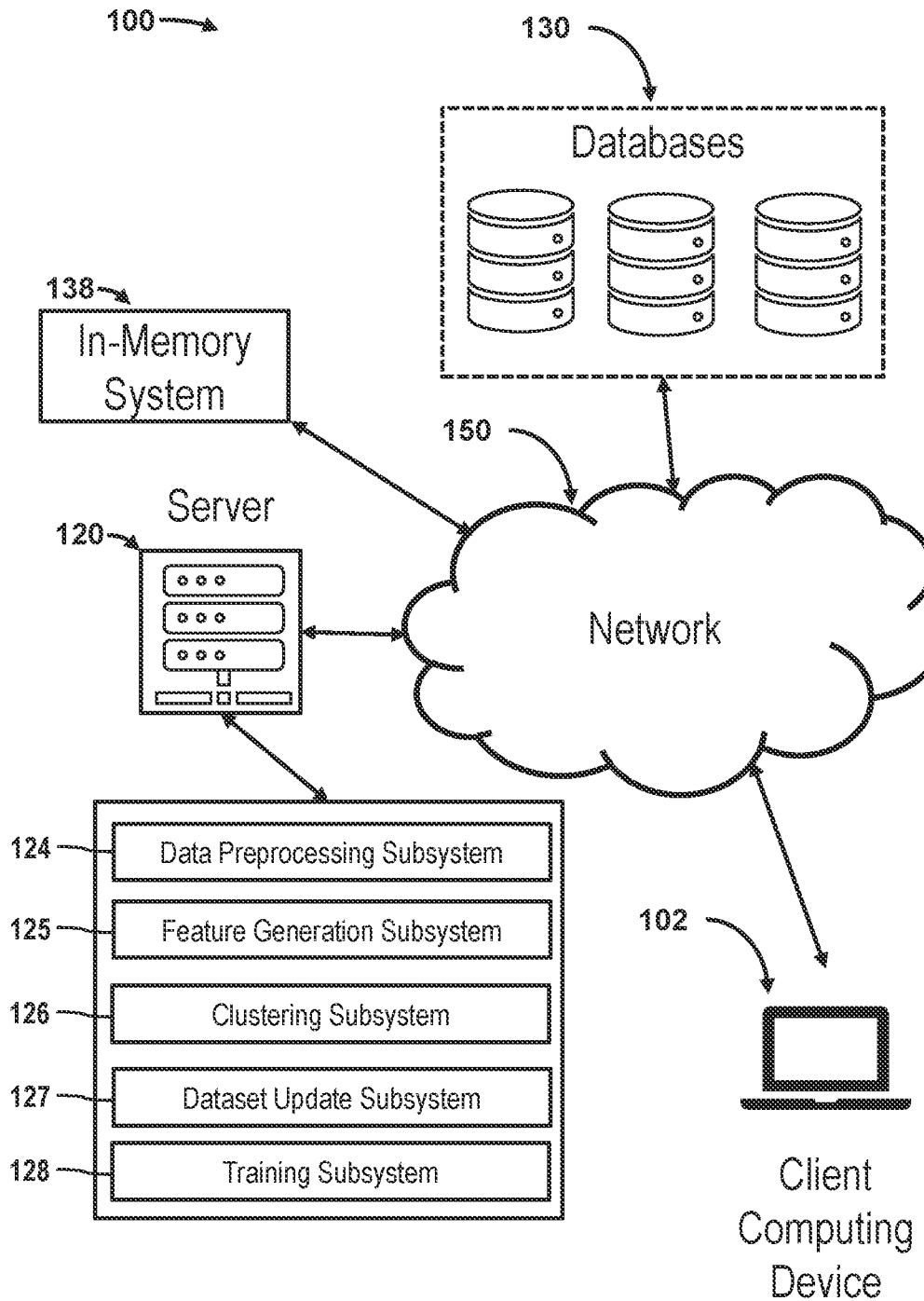
FIG. 1 shows an illustrative computer system for evolving or updating a training dataset or other dataset for use with one or more prediction models, in accordance with one or more embodiments.

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Various types of learning models are applicable to different types of applications and useful to generate different types of outcomes. However, a significant portion of these learning models rely on manually labeled training data under the presumption that this training data is the gold standard for accuracy and precision. However, as applications, needs, and environmental factors evolve over time, the labeled training data may deteriorate with respect to new training needs. For example, an original training dataset may include records that have been manually labeled into different classes, such as "error report" or "positive feedback." Over time, an application team may wish to determine specific types of errors and generate new training data that may be separated into refined classes such as "snag error" and "equipment failure." In many cases, the original training data may interfere with the accuracy of a machine-learning model trained to label records into a set of classes that include the refined classes. To overcome this data deterioration, typical applications may be forced to discard the original training data when attempting to train updated learning models or train and use two different machine learning models in order to predict classes of the original training dataset. However, such solutions may be wasteful with respect to any unused data or computationally expensive by requiring the implementation and execution of multiple machine learning models.

To overcome these challenges or other challenges, some embodiments may evolve a training dataset as new data is provided by updating the training dataset with the new data. The new classes used in the new data may be integrated into the training dataset in an autonomous or user-regulated fashion. By evaluating clustering analysis scores representing data quality indices, some embodiments may determine whether a new dataset is compatible for integration with a training dataset. Various types of clustering analysis algorithms may be used to generate clustering analysis scores, such as a density-based clustering validation (DBCV) algorithm, a silhouette measurement, a Dunn measurement, a Maulik-Bandyopadhyay measurement, etc.

Some embodiments may further use one or more clustering analysis scores associated with specific clusters or even specific records to determine whether to relabel a cluster or a record in the cluster. A cluster may include a grouping of records, where features of the records may be represented in a feature space representing a feature of the features. For example, a set of records "r1," "r2,", "r3," and "r4" may have feature values for the features "f1," "$f_2$," and "f3." If this set of records is represented as a set of JSON objects '["r1": {"f1": 0.10, "f2": 0.11, "f3": 0.12}, "r2": {"f1": 0.11, "f2": 0.12, "f3": 0.11}, "r3": {"f1": 0.10, "f2": 0.12, "f3": 0.11}, }, "r4": {"f1": 0.90, "f2": 0.99, "f3": 0.99}].' Some embodiments may then represent these records as vectors "[0.10, 0.11, 0.12]," "[0.11, 0.12, 0.11]," "[0.10, 0.12, 0.11]," and "[0.90, 0.99, 0.99]" for the records "r1," "r2,", "r3," and "r4," respectively. Some embodiments may use a clustering analysis algorithm to group "r1," "r2," and "r3" into a first cluster based on their corresponding vectors and omit record "r4" from the first cluster based on the distance between the vector corresponding with "r4" and the other vectors corresponding with "r1," "r2," and "r3". Some embodiments may also generate synthesized classes based on a determination that the record or a region in feature space encompassing the record is at an intersection of regions corresponding with different classes. When relabeling a record or recommending that a record be relabeled as a part of dataset integration operations, some embodiments may recommend new classes or synthesized classes.

FIG. 1 shows an illustrative computer system for evolving or updating a training dataset or other dataset for use with one or more prediction models, in accordance with one or more embodiments. A system 100 includes a client computing device 102. While shown as a laptop computer, it should be noted that the client computing device 102 may include other types of computing devices such as a desktop computer, a wearable headset, a smartwatch, another type of mobile computing device, etc. In some embodiments, the client computing device 102 may communicate with various other computing devices via a network 150, where the network 150 may include the Internet, a local area network, a peer-to-peer network, etc.

The client computing device 102 may send and receive messages through the network 150 to communicate with a server 120, where the server 120 may include non-transitory storage media storing program instructions to perform one or more operations of subsystems 124-128. While one or more operations are described herein as being performed by particular components of the system 100, those operations may be performed by other components of the system 100 in some embodiments. For example, one or more operations described in this disclosure as being performed by the server 120 may instead be performed by the client computing device 102. Furthermore, some embodiments may communicate with an API of a third-party data service via the network 150 to perform a learning model training operation, obtain machine learning model parameters, or use other services that perform one or more operations described in this disclosure.

In some embodiments, the set of computer systems and subsystems illustrated in FIG. 1 may include one or more computing devices having electronic storage or otherwise capable of accessing electronic storage, where the electronic storage may include the set of databases 130. The set of databases 130 may include values used to perform operations described in this disclosure, such as preprocessing parameters, training datasets, machine learning model parameters, feature space parameters (e.g., embedding vectors), classes and records associated with classes, etc. For example, records of the set of databases 130 may include chat logs, other documents, event logs, tokens generated from the chat logs or other documents, classes associated with a token or sequence of tokens, vectors generated from the tokens and associated with the labels, etc. As used in this disclosure, a "record" may refer to any type of data object that includes a set of feature values for a set of features, including a record of a DBMS database, a row of a data matrix, transactions of a transaction dataset, etc. As used in this disclosure, a training dataset may include a dataset used for any part of a training process, such as direct training of a machine learning model, testing a machine learning model, or validating a machine learning model. As used in this disclosure, a "class" may be any type of data label, category, or other value associated with a class. In addition, the client computing device 102 or the server 120 may access data stored in an in-memory system 138, where the in-memory system may include an in-memory data store that stores data in a key-value data store such as Redis™. Some embodiments may store learning model parameters, learning model results, or other data in an in-memory data store to accelerate data retrieval or learning model operations.

In some embodiments, data preprocessing subsystem 124 may perform preprocessing operations on one or more datasets. In the context of natural language processing, the data preprocessing subsystem 124 may obtain text and convert the document into a set of tokens by performing a set of preprocessing operations. For example, the data preprocessing subsystem 124 may obtain a chat log and perform preprocessing operations such as lemmatization, stop word removal, sub-word determination, etc. to determine a sequence of tokens, where each token may include a word, a sub-word, a number, etc. Some embodiments may perform preprocessing operations on an initial dataset, a new dataset, etc.

In other contexts, such as computer vision or fraud detection in transactional data, preprocessing operations may differ from text preprocessing operations. For example, some embodiments may perform preprocessing operations on a set of images, such as resizing, histogram equalization, noise removal, segmentation, or edge smoothing. For example, some embodiments may obtain a set of images of faces and perform preprocessing operations to remove noise from the image by applying a Gaussian blur, segment portions of the face, and smooth the edges of the segmented portions.

In some embodiments, a feature generation subsystem 125 may determine a set of features based on records of the first dataset. A feature may be a direct value (e.g., a measurement, a user input, etc.) or a derived value determined based on the direct value. In the context of natural language processing, a record may include a word, a token generated from the word, a sequence of words, a sequence of tokens generated from the sequence of words, etc. Some embodiments may generate a set of features for the record by generating embedding vectors based on the token(s) of the record. Some embodiments may use an encoder neural network or another type of encoder to encode tokens into an embedding vector. For example, the candidate token "flkl2z" may be provided to an autoencoder to generate a five-dimensional embedding vector "[0.61, 0.62, 0.01, 0.02, 0.99]." Other embodiments may generate embedding vectors with more than two dimensions, more than five dimensions, more than ten dimensions, more than 100 dimensions, more than 1000 dimensions, or another number of dimensions, etc. Some embodiments may train an autoencoder to assign different vectors based on different input tokens, where the vectors may be represented in a feature space. Alternatively, or in addition, a feature may represent the presence of a specific word, the presence of a specific vector generated from the word, the presence of a specific sequence of words, the presence of a specific sequence of vectors, a count of other features (e.g., the count of the number of the same vector, a count of the total number of vectors).

In other contexts, other types of feature generation operations may occur. For example, in the context of computer vision, some embodiments may include direct image data as features, where the direct image data may include pixel brightness values, pixel color values, pixel positions, etc. Alternatively, or in addition, some embodiments may include derived values as pooled pixel values, recognized shapes, recognized combination of shapes, etc. In the context of audio data or optical data, some embodiments may include frequency, amplitude, duration, etc. Alternatively, or in addition, some embodiments may include Fourier components, a measure of central tendency, noise estimates, etc.

In some embodiments, a clustering subsystem 126 may determine clusters of vectors in a feature space, where each record may represent a vector. As should be understood in this disclosure, each vector in a cluster may be associated with a record in a dataset. Furthermore, if a vector represents an associated record in a feature space, labeling the vector with the class should be understood as sufficient to label the associated record with the class. Similarly, labeling a record with a class is sufficient to label a vector associated with the record with the class. Some embodiments may predefine a cluster of records based on the classes that the records are assigned to in a training dataset. For example, if a first record, second record, and third record are labeled with the class "I," some embodiments may predefine a first cluster as including the first, second, and third records and associate the first cluster with the class "I."

Alternatively, or in addition, some embodiments may ignore one or more classes of a training set to independently generate clusters for analysis operations. For example, the clustering subsystem 126 may assign each vector generated by the encoder layers into a cluster based on distances between vectors in the latent space. When performing clustering operations, the clustering subsystem 126 may use one or more of various types of clustering algorithms. Some embodiments may perform clustering by using density-based clustering (e.g., density-based spatial clustering of applications with noise), centroid-based clustering (e.g., K-means clustering), distribution-based clustering (e.g., clustering-based on Goshen distributions), hierarchical clustering, etc. When performing independent clustering operations to generate clusters, some embodiments may select a subset of a training dataset or another dataset as initial seeds. For example, if a first vector from a first subset of vectors is assigned to a first class, some embodiments may select the first vector as a seed vector for performing density-based clustering to generate a first cluster of records labeled with the first class. In some embodiments, the generated first cluster may include additional vectors other than the first subset of vectors or may include fewer vectors than the first subset of vectors.

Some embodiments may perform cluster validation to determine clustering analysis scores that may be used as a data quality index. A clustering analysis score may be specific to a cluster or to a specific vector of the cluster, where a clustering analysis score may indicate the likelihood that a record is a part of the cluster, the likelihood that the cluster is valid in comparison to other clusters of a dataset, etc. Some embodiments may use one of various metrics to determine a clustering analysis score. These metrics may use distances between vectors in the same cluster and distances between vectors in different clusters to determine these metrics. As used in this disclosure, a distance may be a Manhattan distance, a Minkowski distance (e.g., a Euclidean distance), a Hamming distance, etc. For example, some embodiments may determine a distance between first and second records based on a Manhattan distance between the first and second records.

Some embodiments may use one or more of various types of clustering analysis scores for determining whether to combine a record or whether a record should be relabeled, where a clustering analysis score may be based on distances between records, clusters, or other distances in a feature space. In some embodiments, a clustering analysis score may include or be derived from a measure of central tendency of distances between a record and other records. For example, some embodiments may determine a first mean distance between a record a first M nearest neighbors of a first cluster and a second mean distance between a record a first M nearest neighbors of a second cluster. Based on a determination that the second mean distance is greater than the first mean distance, some embodiments may generate a relabeling indication for the record that indicates a class labeled with the second cluster. Some embodiments may normalize distances or measurements to measure likelihood to determine the likelihood that a record or set of records is part of a first cluster.

Some embodiments may determine a clustering analysis score using a set of DBCV operations, where a DBCV operation may include an operation used to determine a DBCV score, where the DBCV score may include an index described in Moulavi et al. (Moulavi, Davoud, et al. "Density-Based Clustering Validation." Proceedings of the 2014 SIAM international conference on data mining. Society for Industrial and Applied Mathematics, 2014), the entirety of which is incorporated by reference herein. For example, some embodiments may perform DBCV operations by determining a validity index for a cluster by first determining an all-points-core-distance (APCD) of each respective vector in a feature space between the respective vector and its neighboring vectors in the cluster, where the APCD of a vector may be correlated with an inverse of the density associated with the vector. Some embodiments may then determine a set of mutual reachability distances (MRDs), where each MRD may represent a distance between two vectors in the feature space, where this distance is the greater of a set of distances that include the APCD of either vector and the distance between the two vectors. Some embodiments may determine minimum spanning trees (MSTs) for the clusters, where a minimum spanning tree may represent a tree for a graph representing the MRDs. Some embodiments may then determine a density sparseness for a cluster based on a maximum edge of its associated MST. In addition, some embodiments may determine a density separation of a first cluster to a second cluster based on a minimum MRD between vectors of the pairs of vectors, where each pair of the pairs of vectors includes a vector of the first cluster and a vector of the second cluster.

Some embodiments may determine a DBCV score of a first cluster with respect to a second cluster based on a ratio of a first value to a second value, where the DBCV score of the first cluster to the second cluster may be used as a clustering analysis score used to determine whether the first cluster is a part of the second cluster. Some embodiments may determine the first value based on a difference between the density separation of the first and second clusters and the density sparseness of the first cluster. Some embodiments may determine the second value based on a minimum of a set of values that include the density separation of the first and second clusters and the density sparseness of the first cluster.

As described elsewhere, some embodiments may determine whether a record that is part of a first cluster should be relabeled to include a class of a different cluster. Some embodiments may indicate a record for relabeling by indicating an entire cluster that includes the record for relabeling. For example, based on a determination that a DBCV score for a first cluster with respect to a second cluster is less than a threshold, some embodiments may generate a relabeling indication for the first cluster that recommends relabeling records of the first cluster to be associated with a class of the second cluster. Alternatively, some embodiments may bifurcate the cluster to generate a set of sub-clusters, where some embodiments may then generate a relabeling indication for a sub-cluster.

In addition, some embodiments may determine a cluster validity score for a cluster based on a ratio of a third value to a fourth value, where the third value may be the minimum difference (e.g., a difference that has a least absolute value of a set of differences) of the differences between the density separation of the first and second clusters and the density sparseness of the first cluster. Some embodiments may then determine a dataset validity using the cluster validity scores of each cluster based on a sum of weighted cluster validity scores, where the weights of the weighted cluster validity scores may be based on the number of vectors in the cluster relative to the number of vectors in the dataset. Some embodiments may use some of the operations described above to determine a set of clustering analysis scores for a cluster. In some embodiments, a determination that the set of clustering analysis scores for the cluster satisfies an integration threshold indicates whether the records of the cluster should be aggregated with a training dataset. Alternatively, or in addition, some embodiments may determine validity scores for an entire set of clusters of a dataset based on a weighted sum of ratios associated with the clusters of the entire set of clusters.

Some embodiments may determine a clustering analysis score in other ways, such as by using a silhouette method to determine a clustering analysis score. For example, some embodiments may determine a clustering analysis score by computing a mean average distance for the intra-cluster distances between vectors of a first cluster of a cluster set and a mean average distance for the intra-cluster distances between the first cluster and the other clusters of the cluster set. Some embodiments may determine whether to combine a cluster with a dataset based on the silhouette-determined score associated with the cluster. Alternatively, or in addition, some embodiments may determine a silhouette-derived dataset score for a candidate dataset. Some embodiments may use the silhouette-derived dataset score as a clustering analysis score and compare this silhouette-derived dataset score with an integration threshold to determine whether to combine the candidate dataset with a training dataset.

In some embodiments, a dataset update subsystem 127 may update a record by relabeling the record, where relabeling a record may include changing the class associated with a record. For example, in response to a determination that a record should be assigned to a new class "XV" using one or more operations described in this disclosure, some embodiments may use the dataset update subsystem 127 to associate the class "XV" with the record. Some embodiments may associate a class with a record by adding information to a feature of the record, where the feature may represent an association with a class. Alternatively, or additionally, some embodiments may associate a class of the record by updating a separate dataset, where the separate dataset may indicate which records are associated with which classes.

In some embodiments, a training subsystem 128 may train a machine learning model using training data. As described elsewhere, some embodiments may first train a machine learning model based on the original dataset. For example, some embodiments may obtain an original training dataset having records that are classifiable as one of ten different classes. Some embodiments may then use the training dataset to train a machine learning model and generate a first trained machine learning model capable of labeling an input record with one of the ten different classes. After evolving the training dataset with a new dataset by adding the new dataset to the original training dataset and labels to one or more records of the original dataset using the operations described in this disclosure, some embodiments may retrain the machine learning model based on the evolved training dataset. For example, after updating the original dataset that included ten classes with a new dataset that included five additional classes, some embodiments may generate a second trained machine learning model based on the updated dataset having fifteen classes. After performing a training operation, some embodiments may then label an input record with one of fifteen different classes.

Figure 2:
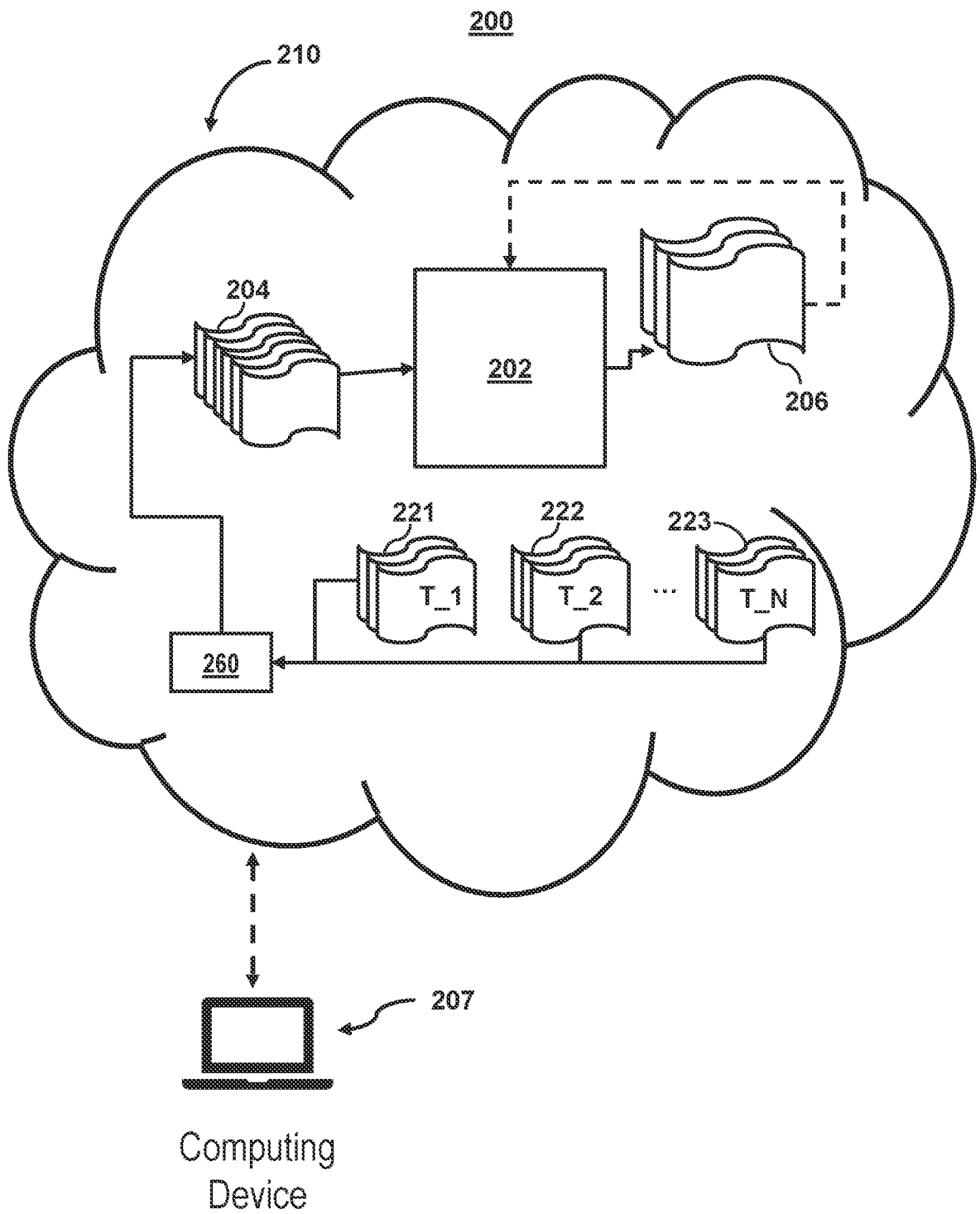
FIG. 2 shows an illustrative diagram of a machine learning model and cluster evolution system, in accordance with one or more embodiments.

FIG. 2 shows an illustrative diagram of a machine learning model and cluster evolution system, in accordance with one or more embodiments. A system 200 may include computing device 207, where the computing device 207 may be any computing device, including, but not limited to a smartphone, a laptop computer, etc. FIG. 2 also includes cloud system 210 implemented on a distributed computer system, where the cloud system 210 may include any computing device described in this disclosure or any other type of mobile computing device, fixed computing device, or another computing device. In some embodiments, the distributed computer system may include a set of computing nodes such as a set of servers or remote computing devices operated by a third party, where the cloud system 210 may include a set of programs or computing services being executed by the distributed computer system. In some embodiments, the cloud system 210 may perform processor operations or data storage operations similar to or the same as those described elsewhere in this disclosure. For example, the cloud system 210 may perform a set of operations performed by the client computing device 102, the server 120, the network 150, or the set of databases 130. The set of databases 130 may each be controlled by different computing nodes of the set of computing nodes, and a query received by the set of databases 130 may cause each node of the set of computing nodes to perform a search based on the query. For example, some embodiments may retrieve data, update datasets with new datasets, or train machine learning models using the cloud system 210.

Some embodiments may update the input dataset 204 with a set of new datasets over time. For example, some embodiments may update the input dataset 204 with a first additional dataset 221, a second additional dataset 222, and an N-th additional dataset 223, where various numbers of additional datasets may be used to update the input dataset 204 at different times between the second additional dataset 222 and the N-th additional dataset 223. Each of the additional datasets 221-223 or other additional datasets may be provided at different times and may include different sets of new classes that are not used in the input dataset 204 before the input dataset 204 is updated with additional datasets. As new datasets are used to update an initial dataset over a period of time, the initial dataset may evolve and be usable for new machine learning operations or applications over the period of time. For example, some embodiments may use a clustering analysis subsystem 260 to determine a set of clustering analysis scores for records in a dataset, where the dataset may be an aggregated dataset of the original records of the input dataset 204 and the first additional dataset 221.

Some embodiments may synthesize a new set of classes based on an additional dataset. For example, in response to a determination that a region of a feature space lies at the intersection of two or more clusters, where each cluster may be associated with a different class, some embodiments may generate a new class as a fusion of the classes associated with two or more clusters. Some embodiments may then automatically label records within the intersection region with the synthesized class.

Alternatively, or in addition, updates to the records of the input dataset 204 may be performed via user-provided inputs. For example, based on scores outputted by a clustering analysis subsystem 260, some embodiments may indicate one or more low-score records that may then be displayed to a user. Some embodiments may display the low-score records in a list by changing a color, changing a shape, updating a font type, adding a visual marker, or making another visual change to a user interface to indicate a record associated with a relabeling indication. A user may update the low-score records by relabeling one or more records with one or more new classes or removing one or more previous classes assigned to the low-score records. Furthermore, some embodiments may update a user interface by recommending one or more classes when providing a recommendation to relabel the indicated records, where the recommended class may include a class of a new dataset or a synthesized class.

Some embodiments may update the input dataset 204 with the first additional dataset 221 by using a clustering analysis subsystem 260 to determine whether or not to add the first additional dataset 221, or records of the first additional dataset 221 to the input dataset 204. Some embodiments may then use clustering analysis scores or other values provided by the clustering analysis subsystem 260 to determine whether or not to update one or more records of the input dataset 204 based on scores associated with those records. Similarly, some embodiments may update the input dataset 204 with the second additional dataset 222, the N-th additional dataset 223, some other additional dataset as they are obtained by adding the respective additional dataset to the input dataset 204 or associating records of the input dataset 204 to new classes of the additional datasets.

In some embodiments, the cloud system 210 may include a machine learning model 202. The machine learning model 202 may take input dataset 204 and provide outputs 206. The machine learning model 202 may include a neural network model that includes an input layer and a set of hidden layers. Each neural unit of the machine learning model 202 may be connected with many other neural units of the machine learning model 202. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units.

In some embodiments, the machine learning model 202 may update its model parameters (e.g., weights, biases, or other parameters) based on the outputs 206. In some embodiments, such as where machine learning model 202 is a neural network, connection weights may be adjusted to reconcile differences between the neural network's prediction and reference feedback. For example, an output layer of the machine learning model 202 may correspond with a predicted class (e.g., a data label), and the predicted class may be provided to an input layer of the machine learning model 202 during training.

In some embodiments, machine learning model 202 may include multiple layers (e.g., where a signal path traverses from front layers to back layers). In some embodiments, the machine learning model 202 may use backpropagation techniques, where forward stimulation is used to reset weights on the "front" neural units. For example, one or more neural units (or cells) of the neural network may require that their respective errors are sent backward through the neural network to facilitate the update process (e.g., backpropagation of error). Updates to the connection weights may be correlated with the magnitude of error propagated backward after a forward pass has been completed, where such updates use various optimization techniques such as simulated annealing or gradient descent. In this way, for example, the machine learning model 202 may be trained to generate better predictions. In some embodiments, stimulation and inhibition operations for the machine learning model 202 may be more free-flowing, with connections interacting in a more chaotic and complex fashion.

The machine learning model 202 may include one or more types of models, such as a neural network model. The neural network used to label a record may include a long-short-term-memory (LSTM) neural network, a convolutional neural network, a transformer neural network, or another type of neural network. Alternatively, or in addition, some embodiments may use a weak supervision method for training operations. For example, some embodiments may use a boosted random forest model (e.g., a random forest model implemented with XGBoost or another boosting technique) to create an aggregate of weak learners trained to label a record based on features of the record.

Figure 3:
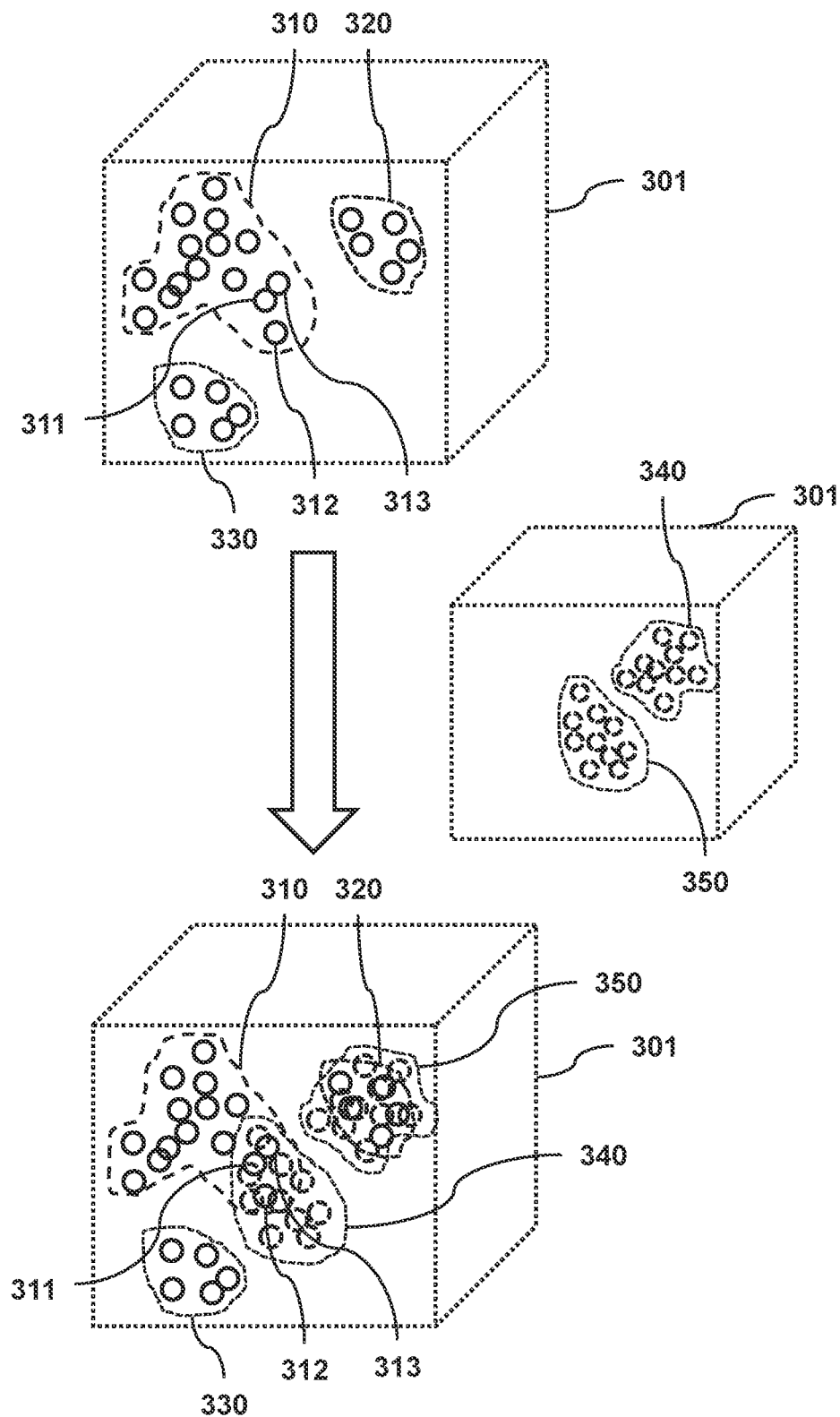
FIG. 3 shows a representation of the use of clustering analysis operations to determine vectors in a feature space, in accordance with one or more embodiments.

FIG. 3 shows a representation of the use of clustering analysis operations to determine vectors in a feature space, in accordance with one or more embodiments. A feature space 301 is depicted as a three-dimensional space, where each dimension may represent a feature value. While the feature space 301 has three dimensions, a feature space may include a number of other features, such as four dimensions, five dimensions, more than five dimensions, ten dimensions, more than ten dimensions, 100 dimensions, more than 100 dimensions, etc. The feature space 301 shows a first cluster 310, where the first cluster includes vectors 311-313. The first cluster 310 includes other vectors, where each vector in the first cluster 310 is labeled with the class "alpha" in a labeled dataset. The feature space 301 also shows a second cluster 320 and a third cluster 330, where the second cluster 320 is labeled with the class "beta," and where the third cluster 330 is labeled with the class "delta." Each of the vectors shown in the feature space 301 represents a record in a first training dataset that may be used to train a machine learning model. For example, some embodiments may train a machine learning model to label a candidate record with the class "alpha" if the candidate record has features within the region defined by the first cluster 310. Similarly, some embodiments may train the machine learning model to label a second candidate record with the class "beta" if the candidate record has features within the region defined by the second cluster 320 and label a third candidate record with the class "delta" if the candidate record has features within the region defined by the third cluster 330.

Some embodiments may receive a new dataset that includes records labeled with one or more new classes that are not present in an initial dataset. For example, some embodiments may receive an additional dataset in the feature space 301 represented by records of the fourth cluster 340 and the fifth cluster 350. The fourth cluster 340 may be associated with a class "gamma," and the fifth cluster 350 may be associated with a class "epsilon." Some embodiments may perform a set of initial clustering analysis operations on the additional dataset represented by the fourth cluster 340 and the fifth cluster 350 to determine whether a set of validity scores or other scores satisfy a set of new dataset criteria. In response to a determination that the set of validity scores satisfies the set of new dataset criteria, some embodiments may add records of the new dataset to the initial dataset for additional analysis. For example, some embodiments may perform a silhouette clustering analysis to determine a set of values representing the clustering analysis scores of each cluster. If a silhouette threshold is equal to 0.95, some embodiments may combine the fourth cluster 340 with the dataset represented by the first cluster 310, the second cluster 320, and the third cluster 330 if a silhouette-derived clustering analysis score of the fourth cluster 340 is greater than or equal to 0.95.

Some embodiments may combine the new dataset represented by the fourth cluster 340 and the fifth cluster 350 with the dataset represented by the first cluster 310, the second cluster 320, and the third cluster 330, where each of the records in each of the clusters may share a feature space. As should be understood in this disclosure, records from different datasets may share a feature space so long as the records of the datasets share the same set of features. Furthermore, it should be understood that different records may share a feature space even if they do not have identical features. For example, a first and second record may share a feature space even if a first record has additional features that the second record does not.

After aggregating a new dataset with an old dataset, some embodiments may perform operations to update records of the old dataset. For example, some embodiments may use clustering analysis operations to generate clustering analysis scores for clusters or a set of records of clusters to determine whether the cluster or set of records of the cluster should be relabeled. For example, in response to a determination that clustering analysis scores of the records 311-313 indicate that the records 311-313 are within the region of the fourth cluster 340 and are thus similar to records of the fourth cluster 340, some embodiments may associate the records 311-313 with the class "gamma" or another class associated with the fourth cluster 340. Furthermore, some embodiments may relabel records of an entire cluster to be associated with a new class in response to a determination that a clustering analysis score between two clusters satisfies a similarity threshold. For example, some embodiments may relabel all of the records of the second cluster 320 with the class "epsilon" in response to a determination that a clustering analysis score determined using DBCV operations between the second cluster 320 and the fifth cluster 350 is greater than a similarity threshold. Based on a determination that a score associated with a cluster or that a score associated with a record of the cluster satisfies a similarity threshold, some embodiments may generate a relabeling threshold the cluster or record of the cluster, respectively.

Figure 4:
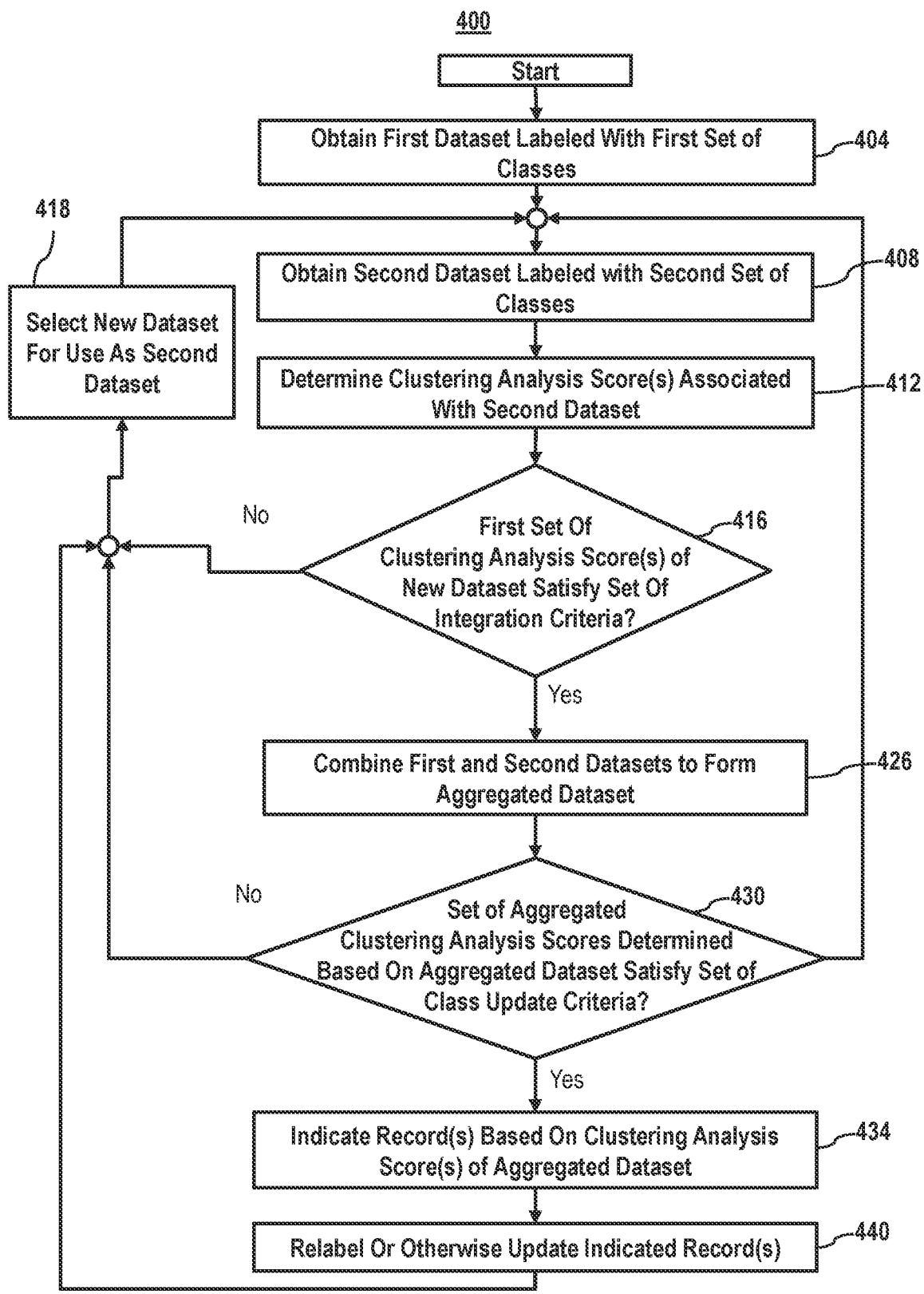
FIG. 4 shows a flowchart of evolving a dataset over time, in accordance with one or more embodiments.

FIG. 4 shows a flowchart of evolving a dataset over time, in accordance with one or more embodiments. Some embodiments may obtain a first dataset labeled with a first set of classes, as indicated by block 404. For example, some embodiments may obtain a training dataset that includes 1000 records, for each respective record of the 1000 records may include values for a set of 64 features. Furthermore, records of the training dataset may be labeled with one or more classes of the first set of classes. For example, each record of the training dataset may be labeled with a class selected from the set of classes '["error"; "positive feedback"; "complaint"; "noise" ].'

Some embodiments may actively seek out datasets to combine with an older dataset in response to a determination that a machine learning model trained on the older dataset is becoming inaccurate. For example, some embodiments may determine that an accuracy is less than an accuracy threshold by receiving a feedback message from a user or testing system indicating that a machine learning model has an accuracy that is less than an accuracy threshold. In response to a determination that the accuracy is less than the accuracy threshold, some embodiments may retrieve different datasets compatible with the first dataset for use as additional training data. For example, some embodiments may send a query to a database, where the query includes a set of dataset parameters of the first dataset (e.g., a list of feature identifiers of features of the first dataset, a category of the first dataset, an identifier of the dataset, etc.). Some embodiments may then receive a second dataset in response to the query for use in operations described in this disclosure, such as machine learning model training operations.

Some embodiments may perform an initial set of clustering analysis operations on the first dataset to determine an initial set of clustering analysis scores. For example, some embodiments may perform a silhouette analysis on a training dataset to determine an initial set of clustering analysis scores that includes a silhouette score ranging between −1 and +1. Some embodiments may then use the silhouette score as a data quality score and compare the data quality score to a data quality threshold. A data quality score may indicate a level of trust assigned to a dataset or a subset of records of a dataset and may be equal to or otherwise based on a clustering analysis score. For example, if a silhouette score for a dataset is equal to 0.25, some embodiments may set the data quality score for the dataset to be equal to 0.25. Alternatively, or additionally, some embodiments may set the data quality score to another clustering analysis score. For example, some embodiments may determine a DBCV score for a dataset equal to 0.35 and set a data quality score for the dataset to be equal to 0.35 in response. Alternatively, some embodiments may transform a clustering analysis score into another value using a set of functions and use the output of the set of functions as a data quality score. For example, some embodiments may set a data quality score to be equal to a weighted sum of a silhouette score and a DBCV score, where the weights of the weighted sum may be constant values k1 and k2. Alternatively, or additionally, some embodiments may use some other set of operators to determine a set of data quality scores based on a clustering analysis score, where the set of operators may include an addition operator multiplicative operator, logarithmic operator, exponential operator, factorial operator, some combination thereof, etc. Furthermore, some embodiments may assign different data quality scores to different clusters of a dataset. For example, some embodiments may determine cluster-specific DBCV scores for each cluster of a dataset and assign different data quality scores to each of the different clusters. In response to a determination that the data quality score satisfies the data quality threshold, some embodiments may proceed to use the first dataset for other operations described in this disclosure, such as operations described by block 408. Alternatively, in response to a determination that the data quality score does not satisfy the data quality threshold, some embodiments may indicate one or more records of the first dataset for relabeling, modification, or another type of review.

Some embodiments may receive data and determine that a cluster may be split into separate clusters that share a class. For example, some embodiments may obtain a dataset that includes a first set of records labeled with the class "derivative," where a first subset of the first set is centered around the feature space position [0.2, 0.2, 0.2, 0.0, 0.0] and a second subset of the first set is centered around the feature space position [0.3, 0.3, 0.0, 0.9, 0.7]. Some embodiments may initially assign each record of the first set of records to a first cluster labeled with a first class and determine a first clustering analysis score, such as a silhouette score or a DBCV score. Some embodiments may then split the initial cluster into a pair of candidate clusters using a bisecting method, such as a bisecting k-means method, a bisecting x-means method, or a bisecting g-means method. Some embodiments may then determine a second clustering analysis score using the same method used to determine the initial clustering analysis score and compare the first and second clustering analysis scores. The output comparison value may represent which of the two scores is greater. Based on a determination that the comparison value satisfies a set of splitting criteria, some embodiments may set the candidate clusters as separate clusters in the dataset, where a second cluster may be split off from the first cluster, where both the first and second clusters are labeled with the class. Furthermore, some embodiments may perform similar operations to split clusters of additional datasets or aggregated datasets.

Some embodiments may obtain a second dataset labeled with a second set of classes, as indicated by block 408. The second dataset may share a feature space with the first dataset. The size of a feature space representing the shared features between the first and second datasets may be a value greater than one, a value greater than ten, a value greater than 100, or some other value. For example, if 64 features characterize records of the first dataset, records of the second dataset may also be characterized by the 64 features. Alternatively, or in addition, the second dataset may include records having more features than features of the first dataset, where records having more than those features may still be used for operations described in this disclosure so long as they share a feature space with the first dataset. For example, if records of the first dataset are represented in a feature space of 20 features, and if records of the second dataset include 25 features, where the 25 features include the 20 features, some embodiments may use these records for clustering analysis operations or other operations described in this disclosure. While some embodiments may obtain a second dataset having a greater number of features than a first dataset, some embodiments may obtain a second dataset having fewer features than the first dataset.

Some embodiments may obtain a candidate dataset for inclusion into a training dataset and perform an initial set of operations to determine whether the candidate dataset is compatible with a training dataset based on other values associated with the candidate dataset. These other values may include metadata associated with the candidate dataset, timestamps associated with the candidate dataset, or other information associated with the candidate dataset. Some embodiments may determine whether these other values satisfy a set of criteria before performing other operations described in this disclosure. Such criteria may include a criterion that the candidate dataset was created after a training dataset, that the candidate dataset must be related to a different category than a training dataset, etc.

Some embodiments may determine a first set of clustering analysis scores associated with the second dataset, as indicated by block 412. Some embodiments may determine an initial set of clusters based on classes associated with the records of this second dataset. For example, if a first record represented by a first vector in a feature space is labeled with a class "alpha" and a second record represented by a second vector in the feature space is labeled with the class "alpha," some embodiments may assign the first and second records to a first cluster that is labeled or otherwise associated with the class "alpha." Some embodiments may then determine a first set of clustering analysis scores based on the clusters in the feature space, where the clusters may include vectors representing records of the second dataset.

As described elsewhere in this disclosure, various clustering analysis operations may be performed to generate clustering analysis scores. Some embodiments may determine clustering analysis scores based on distances between records, such as measures of central tendencies of distances between records. Some embodiments may implement a DBCV operation and determine a set of DBCV scores for use as clustering analysis course, with a set of DBCV scores that may include individual pairwise cluster relationship scores, validation scores for each cluster, or a whole-dataset DBCV score. For example, some embodiments may determine that a set of DBCV scores for a first cluster of a candidate dataset that includes three clusters by determining includes: 1) a first pairwise DBCV score indicating the correlation between a first cluster and a second cluster, 2) a second pairwise DBCV score indicating the correlation between the first cluster and a third cluster, 3) a cluster-specific DBCV score indicating the correlation between the first cluster and all other clusters of the candidate dataset, 4) a dataset-specific DBCV score indicating a validity of the entire set of clusters. Some embodiments may then compare these scores with a set of thresholds to determine whether to combine a candidate dataset or clusters of a candidate dataset with a training dataset.

While the above example describes using DBCV operations to determine clustering analysis scores, other types of clustering analysis operations may be used. For example, some embodiments may use a silhouette method, a Dunn Index, a Calinski-Harabasz Index, or another type of clustering validation method to determine clustering analysis scores. Different types of clustering analysis methods may correspond with different types of criteria to determine clustering validity. Furthermore, some embodiments may use multiple types of clustering analysis methods to determine analysis scores. For example, some embodiments may apply DBCV operations to a set of clusters to determine a first subset of clustering analysis scores and apply silhouette operations to determine a second subset of clustering analysis scores. In some embodiments, a first set of clustering analysis scores for use in operations described by block 416 below may include both the first and second subset clustering analysis scores.

Some embodiments may determine whether the first set of clustering analysis scores satisfies a set of integration criteria, as indicated by block 416. Some embodiments may use a clustering analysis score as a data quality score, where the corresponding data quality score of a dataset should satisfy the integration threshold. For example, some embodiments may determine a DBCV index for a dataset that is equal to 0.95 and compare the DBCV index with an integration threshold equal to 0.9. In response to a determination that the DBCV index is greater than the integration threshold, some embodiments may determine that the first set of clustering analysis scores satisfies the set of integration criteria.

Some embodiments may determine multiple types of clustering analysis scores. Some embodiments may require that all criteria of a set of integration criteria be satisfied before determining that the first set of clustering analysis scores satisfies the set of integration criteria. For example, some embodiments may require that each cluster-specific DBCV score be greater than a first integration threshold and also that a DBCV index score associated with all the clusters of a dataset be greater than a second integration threshold. Alternatively, some embodiments may require only that a subset of the set of integration criteria be satisfied. For example, some embodiments may determine that a first set of clustering analysis scores of a dataset satisfies a first set of criteria in response to a determination that the DBCV index score associated with all the clusters of the dataset satisfies a first integration threshold even if one or more cluster-specific DBCV scores do not satisfy a second integration threshold.

In response to a determination that the first set of clustering analysis scores satisfies the set of integration criteria, operations of the process 400 may proceed to operations described by block 426. Otherwise, operations of the process 400 may proceed to operations described by block 418.

Some embodiments may select a new dataset for use as the second dataset, as described by block 418. For example, after testing a second dataset for compatibility with the first dataset, some embodiments may obtain a third dataset, where the third dataset may include one or more classes not assigned to records of the second dataset or the first dataset. Some embodiments may then proceed to operations described by block 408 or other operations described in the process 400 by using the third dataset in place of the second dataset. Furthermore, as will be described elsewhere in this disclosure, additional new datasets may be processed in a similar manner.

Some embodiments may use known hierarchies or ontologies to update an aggregated dataset. For example, if a first cluster is associated with a first class, if a second cluster is associated with a second class, and if the first and second classes are sub-categories of a third class, some embodiments may label the first and second clusters to be associated with the third class. Some embodiments may obtain information about associations between classes based on a user-provided input, an ontology of classes, a knowledge graph, etc. Furthermore, some embodiments may use the known relationships between classes to indicate possible associations between records and the third class not captured in training data or new data based on distances between clusters in a feature space. For example, some embodiments may determine that a distance between a third cluster and the first cluster is less than the distance between the first and second clusters, and further that the distance between the second cluster and the third cluster is also less than the distance between the first and second clusters. Some embodiments may then relabel the third cluster with the third class or generate a relabeling indication that recommends the third class in response.

Some embodiments may combine the first and second datasets into an aggregated dataset, as indicated by block 426. Some embodiments may combine datasets by updating a dataset directly such that one or both datasets of a pair of datasets being aggregated include the other dataset. For example, if a first dataset is stored in a first database and a second dataset is stored in a second database, some embodiments may combine the first and second datasets by updating the first dataset to include records of the second dataset. Alternatively, some embodiments may combine a first and second dataset by storing an association between the first and second datasets without requiring that either of the datasets include records of the other dataset.

Some embodiments may determine whether a set of aggregated clustering analysis scores determined based on the aggregated dataset satisfies a class update threshold, as indicated by block 430. Some embodiments may update a class (e.g., updating the records labeled with the class) in response to a determination that a set of scores satisfies a class update threshold, where the class update threshold may serve as a trigger that causes the update to the class. Some embodiments may obtain clusters for an aggregated dataset by retraining the original clusters of the datasets being aggregated. Alternatively, some embodiments may also generate new clusters based on classes of the aggregated dataset, such as by using a subset of records of the aggregated dataset as a set of seed records for cluster generation algorithms, such as a density-based algorithm. Some embodiments may perform clustering analysis operations on an aggregated dataset to determine aggregated clustering analysis scores, where the aggregated clustering analysis scores may be used to select one or more records or one or more clusters. Some embodiments may associate the selected record or cluster with a relabeling indication, automatically label the selected record or cluster with a new class or a synthesized class, etc.

In some embodiments, a class update threshold may be a predetermined value. For example, the class update value may be predetermined as the value 0.5, 0.9, 0.95, 0.99, or some other numeric value. Some embodiments may determine that the class update value is satisfied based on a determination that a clustering analysis score is greater than the class update threshold. For example, some embodiments may determine a clustering analysis value indicating the likelihood that a record is a part of a cluster and that the clustering analysis value is greater than the predetermined value 0.9. In response, some embodiments may indicate the record with a relabeling indication.

Alternatively, some embodiments may establish a class update threshold based on another clustering analysis score. For example, some embodiments may set the class update threshold for a record as a first likelihood value indicating that the record is part of a first cluster labeled with a first class, where the first likelihood value may be determined based on a set of scores. Some embodiments may determine that the class update threshold is satisfied in response to a determination that a second likelihood value indicates that the record is part of a second cluster labeled with a second class. Some embodiments may determine a likelihood value for a record being part of a cluster based on distances between the record and records of the cluster.

Some embodiments may apply various types of clustering analysis operations to the aggregated dataset, such as DBCV operations, silhouette operations, Dunn Index, a Calinski-Harabasz Index, or another type of clustering validation method. Clustering analysis operations may include operations based on distances between clusters in a feature space of the clusters. A distance between a first cluster and a second cluster may include a distance between a position in a region defined by the first cluster and a position in a region defined by the second cluster. A region of a cluster may include the feature space positions of the records of the cluster or other positions within an N-dimensional boundary defined by the cluster, where N is the number of dimensions of the feature space. For example, a distance between two clusters may include a distance between a first record of the first cluster and a second record of the second cluster in a feature space, a distance between the first record and a centroid of the second cluster, a distance between a centroid of the first cluster and a centroid of the second cluster, etc.

As described elsewhere in this disclosure, some embodiments may determine which cluster of a set of clusters to assign to a record based on one or more distances between the record to each respective cluster of the set of clusters. For example, some embodiments may determine a set of clustering analysis scores for a first record of a first cluster, such as a first value, a second value, and a third value. Some embodiments may determine the first value based on a set of intra-cluster distances between the first record and other records of the first cluster. Furthermore, some embodiments may determine the second value based on a set of inter-cluster distances between the first record and clusters other than the first cluster. For example, an aggregated dataset may include a first cluster, a second cluster, and a third cluster. Some embodiments may determine a set of clustering analysis scores associated with a first record, where the first cluster includes the first record. Some embodiments may then determine a second set of distances between the first record and the second cluster and a third set of distances between the first record and the third cluster. Some embodiments may then determine a first score based on the second set of distances, such as by determining a mean average of the distances. Similarly, some embodiments may determine a second score based on the third set of distances, where the first density score and second first density score may represent a likelihood that the first record is a part of the second first cluster and a likelihood that the second record is part of the third cluster, respectively. Some embodiments may set a class update threshold based on the first value such that some embodiments may label a record with the second class or associate the record with a relabeling indication that recommends the second class in response to a determination that the second value is greater than the first value. Similarly, some embodiments may label the record with the third class or associate the record with a relabeling indication recommending the third class in response to a determination that the third value is greater than the first value.

Based on a determination that the set of aggregated clustering analysis scores satisfies a class update threshold, some embodiments may proceed to operations described by block 434. Otherwise, operations of the process 400 may proceed to block 418.

Some embodiments may indicate a set of records based on the set of clustering analysis scores of the aggregated dataset, as indicated by block 434. Some embodiments may generate a relabeling indication for the set of records that satisfies a set of criteria, as described above. For example, some embodiments may populate a feature of the set of records to indicate that the record should be relabeled, where the feature is not part of the feature space of shared features used to determine clusters. Alternatively, or in addition, some embodiments may update metadata associated with the set of records to indicate that the set of records should be updated, update an array or index associating the set of records with a relabeling indication, etc. While the term "relabeling indication" is used in this disclosure, the relabeling indication may include various types of labels with different names, values, or descriptors. As used in this disclosure, a relabeling indication may cause some embodiments to display the set of records labeled with the relabeling indication for further review or may tag the set of records for update operations.

Some embodiments may rank a set of clustering analysis scores of select records based on a ranking of the scores. For example, some embodiments may generate a respective data quality index for each respective cluster of an aggregated cluster using a DBCV algorithm. Some embodiments may then select the N clusters associated with the N lowest data quality indices and generate relabeling indications for these selected clusters, where N may be an integer. Furthermore, some embodiments may generate a data quality index or other clustering analysis score for an entire aggregated dataset, where a score that is less than a data quality threshold may cause some embodiments to revert a training dataset to its original data. In some embodiments, the data quality threshold may be a predetermined value. Alternatively, the data quality threshold may be a previous data quality index of the original training data.

Some embodiments may relabel or otherwise update the indicated set of records, as indicated by block 440. Some embodiments may label the set of records indicated with the relabeling indication with a class from the newer dataset. For example, a first cluster of records of a first dataset may be labeled with a first class, and a second cluster of records of a second dataset may be labeled with the second class. In response to a determination that the first cluster is within a region formed by the second cluster of records, some embodiments may label the first cluster of records with the second class. Some embodiments may further update the first cluster by disassociating the first class from the first cluster such that a search for clusters associated with the first class would not retrieve in the first cluster. Alternatively, some embodiments may retain the association between the first class and the first cluster.

Some embodiments may generate a synthesized class from class combinations and use the synthesized class when labeling records. For example, some embodiments may determine that a set of records originally labeled with the class "class1" is within a region of a feature space shared with a cluster labeled with the class "class2." Some embodiments may generate a synthesized class "class1-class2" based on the first and second classes and then label the set of records with the synthetic feature." Some embodiments may then train an instance of a machine learning model to output a synthesized class as a class prediction after being provided with an input record. For example, after training a machine learning model to provide class predictions with a first dataset, some embodiments may update the first dataset to include a second dataset. Updating the first dataset may include generating a synthesized class based on a class of the first dataset and a class of the second dataset. Some embodiments may then re-train the machine learning model based on the updated dataset, where at least one record of the updated dataset is labeled with the synthesized class. By generating and using synthesized classes, some embodiments may provide information about the relationship between classes or aspects of the relationship between classes that were not previously available.

Some embodiments may evolve a training dataset by repeatedly updating a training dataset as additional datasets and new classes are received. For example, some embodiments may perform operations of the process 400 after receiving an additional dataset, such as operations described by blocks 408, 412, 416, 426, 430, 434, or 440. Some embodiments may then repeat the one or more operations of the process 400 after receiving a third dataset at a later time. Furthermore, some embodiments may increase the efficiency of evolving a dataset by first aggregating two or more additional datasets before aggregating the additional datasets with a training dataset. For example, some embodiments may train a machine learning model to provide a class prediction using an initial training dataset, receive an error-specific dataset at a first time, and receive an intent-specific dataset at a second time. Some embodiments may combine the error-specific dataset and the intent-specific dataset by performing one or more operations of the process 400 to form an intermediate aggregated dataset. Some embodiments may then generate an aggregated dataset from the initial training dataset and the intermediate aggregated dataset.

The operations of each method presented in this disclosure are intended to be illustrative and non-limiting. It is contemplated that the operations or descriptions of FIG. 4 may be used with any other embodiment of this disclosure. In addition, the operations and descriptions described in relation to FIG. 4 may be done in alternative orders or in parallel to further the purposes of this disclosure. For example, each of these operations may be performed in any order, in parallel, or simultaneously to reduce lag or increase the speed of a computer system or method. In some embodiments, the methods may be accomplished with one or more additional operations not described, and/or without one or more of the operations discussed. Additionally, the order in which the processing operations of the methods are illustrated (and described below) is not intended to be limiting.

In some embodiments, the operations described in this disclosure may be implemented in a set of processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on a non-transitory, machine-readable medium, such as an electronic storage medium. Furthermore, the use of the term "media" may include a single medium or combination of multiple media, such as a first medium and a second medium. The processing devices may include one or more devices configured through hardware, firmware, and/or software to be specifically designed for execution of one or more of the operations of the methods. For example, it should be noted that any of the devices or equipment discussed in relation to FIGS. 1-2 could be used to perform one or more of the operations in FIG. 4.

It should be noted that the features and limitations described in any one embodiment may be applied to any other embodiment herein, and a flowchart or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

In some embodiments, the various computer systems and subsystems illustrated in FIG. 1 may include one or more computing devices that are programmed to perform the functions described herein. The computing devices may include one or more electronic storages (e.g., the set of databases 130), one or more physical processors programmed with one or more computer program instructions, and/or other components. For example, the set of databases may include a relational database such as a PostgreSQL™ database or MySQL database. Alternatively, or additionally, the set of databases 130 or other electronic storage used in this disclosure may include a non-relational database, such as a Cassandra™ database, MongoDB™ database, Redis database, Neo4j™ database, Amazon Neptune™ database, etc.

The computing devices may include communication lines or ports to enable the exchange of information with a set of networks (e.g., network 150) or other computing platforms via wired or wireless techniques. The network may include the Internet, a mobile phone network, a mobile voice or data network (e.g., a 5G or Long-Term Evolution (LTE) network), a cable network, a public switched telephone network, or other types of communications networks or combinations of communications networks. The network 150 may include one or more communications paths, such as Ethernet, a satellite path, a fiber-optic path, a cable path, a path that supports Internet communications (e.g., IPTV), free-space connections (e.g., for broadcast or other wireless signals), WiFi, Bluetooth, near field communication, or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Each of these devices described in this disclosure may also include electronic storages. The electronic storages may include non-transitory storage media that electronically stores information. The storage media of the electronic storages may include one or both of (i) system storage that is provided integrally (e.g., substantially non-removable) with servers or client computing devices, or (ii) removable storage that is removably connectable to the servers or client computing devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). An electronic storage may store software algorithms, information determined by the processors, information obtained from servers, information obtained from client computing devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 124-128 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems described herein is for illustrative purposes, and is not intended to be limiting, as any of subsystems may provide more or less functionality than is described. For example, one or more of subsystems 124-128 may be eliminated, and some or all of its functionality may be provided by other ones of subsystems 124-128. As another example, additional subsystems may be programmed to perform some or all of the functionality attributed herein to one of subsystems described in this disclosure.

With respect to the components of computing devices described in this disclosure, each of these devices may receive content and data via input/output (I/O) paths. Each of these devices may also include processors and/or control circuitry to send and receive commands, requests, and other suitable data using the I/O paths. The control circuitry may comprise any suitable processing, storage, and/or I/O circuitry. Further, some or all of the computing devices described in this disclosure may include a user input interface and/or user output interface (e.g., a display) for use in receiving and displaying data. In some embodiments, a display such as a touchscreen may also act as user input interfaces. It should be noted that in some embodiments, one or more devices described in this disclosure may have neither user input interface nor displays and may instead receive and display content using another device (e.g., a dedicated display device such as a computer screen and/or a dedicated input device such as a remote control, mouse, voice input, etc.). Additionally, one or more of the devices described in this disclosure may run an application (or another suitable program) that performs one or more operations described in this disclosure.

Although the present invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the scope of the appended claims. For example, it is to be understood that the present invention contemplates that, to the extent possible, one or more features of any embodiment may be combined with one or more features of any other embodiment.

As used throughout this application, the word "may" is used in a permissive sense (i.e., meaning having the potential to), rather than the mandatory sense (i.e., meaning must). The words "include," "including," "includes," and the like mean including, but not limited to. As used throughout this application, the singular forms "a," "an," and "the" include plural referents unless the context clearly indicates otherwise. Thus, for example, reference to "an element" or "a element" includes a combination of two or more elements, notwithstanding use of other terms and phrases for one or more elements, such as "one or more." The term "or" is non-exclusive (i.e., encompassing both "and" and "or"), unless the context clearly indicates otherwise. Terms describing conditional relationships (e.g., "in response to X, Y," "upon X, Y," "if X, Y," "when X, Y," and the like) encompass causal relationships in which the antecedent is a necessary causal condition, the antecedent is a sufficient causal condition, or the antecedent is a contributory causal condition of the consequent (e.g., "state X occurs upon condition Y obtaining" is generic to "X occurs solely upon Y" and "X occurs upon Y and Z"). Such conditional relationships are not limited to consequences that instantly follow the antecedent obtaining, as some consequences may be delayed, and in conditional statements, antecedents are connected to their consequents (e.g., the antecedent is relevant to the likelihood of the consequent occurring). Statements in which a plurality of attributes or functions are mapped to a plurality of objects (e.g., a set of processors performing steps/operations A, B, C, and D) encompasses both all such attributes or functions being mapped to all such objects and subsets of the attributes or functions being mapped to subsets of the attributes or functions (e.g., both/all processors each performing steps/operations A-D, and a case in which processor 1 performs step/operation A, processor 2 performs step/operation B and part of step/operation C, and processor 3 performs part of step/operation C and step/operation D), unless otherwise indicated. Further, unless otherwise indicated, statements that one value or action is "based on" another condition or value encompass both instances in which the condition or value is the sole factor and instances in which the condition or value is one factor among a plurality of factors.

Unless the context clearly indicates otherwise, statements that "each" instance of some collection have some property should not be read to exclude cases where some otherwise identical or similar members of a larger collection do not have the property (i.e., each does not necessarily mean each and every). Limitations as to sequence of recited steps should not be read into the claims unless explicitly specified (e.g., with explicit language like "after performing X, performing Y") in contrast to statements that might be improperly argued to imply sequence limitations, (e.g., "performing X on items, performing Y on the X'ed items") used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless the context clearly indicates otherwise, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Furthermore, unless indicated otherwise, updating an item may include generating the item or modifying an existing time. Thus, updating a record may include generating a record or modifying the value of already-generated value.

Enumerated Embodiments

The present techniques will be better understood with reference to the following enumerated embodiments:
1. A method comprising: obtaining a first dataset associated with a first set of classes; obtaining a second dataset comprising features that are shared with the first dataset; creating an aggregated dataset from the first dataset and the second dataset, the aggregated dataset having a data quality score for the second set of classes that satisfy a first threshold; determining a second set of clusters of records in the second dataset based on the second dataset; determining a distance based on a first record of a first cluster of the first set of clusters and a second record of a second cluster of the second set of clusters in a feature space of the shared features; determining a set of clustering analysis scores based on the distance; and generating an indication for a set of records of the first dataset associated with the set of clustering analysis scores based on the set of clustering analysis scores satisfying a second threshold.
2. The method embodiment 1, wherein each record of the first dataset is labeled with at least one class of the first set of classes
3. The method any of embodiments 1 to 2, wherein each record of the second dataset is labeled with at least one class of a second set of classes
4. The method any of embodiments 1 to 3, wherein at least one record of the second dataset being labeled with a new class included in the second set of classes and not included in the first set of classes
5. The method any of embodiments 1 to 4, wherein creating the aggregated dataset from the first dataset and the second dataset comprises: determining a first set of clusters of records in the first dataset
6. The method any of embodiments 1 to 5, wherein each cluster of records of the first set of clusters is labeled with a respective class of the first set of classes
7. The method any of embodiments 1 to 6, wherein each cluster of the second set of clusters is labeled with a respective class of the second set of classes
8. A method comprising: obtaining a first dataset associated with a first set of classes, wherein each record of the first dataset is labeled with at least one class of the first set of classes; obtaining a second dataset comprising features that are shared with the first dataset, wherein each record of the second dataset is labeled with at least one class of a second set of classes, at least one record of the second dataset being labeled with a new class included in the second set of classes and not included in the first set of classes; creating, from the first dataset and the second dataset, an aggregated dataset, the aggregated dataset having a data quality score for the second set of classes that satisfy a data quality threshold, wherein creating the aggregated dataset from the first dataset and the second dataset comprises: determining a first set of clusters of records in the first dataset, wherein each cluster of records of the first set of clusters is labeled with a respective class of the first set of classes; determining a second set of clusters of records in the second dataset based on the second dataset, wherein each cluster of the second set of clusters is labeled with a respective class of the second set of classes; determining a distance based on a first record of a first cluster of the first set of clusters and a second record of a second cluster of the second set of clusters in a feature space of the shared features; determining a set of clustering analysis scores based on the distance; and generating, based on the set of clustering analysis scores satisfying a class update threshold, a relabeling indication for a set of records of the first dataset associated with the set of clustering analysis scores.
9. A method comprising: obtaining a first dataset used to train a first machine learning model configured to generate class predictions from a first set of classes, wherein each record of the first dataset is labeled with at least one class of the first set of classes, the first dataset having a first data quality score for the first set of classes that satisfies a data quality threshold; obtaining a second dataset comprising features that are shared with the first dataset, wherein each record of the second dataset is labeled with at least one class of a second set of classes, at least one record of the second dataset being labeled with a new class included in the second set of classes and not included in the first set of classes; creating, from the first dataset and the second dataset, an aggregated dataset for training a second machine learning model to be configured to generate class predictions for the second set of classes, the aggregated dataset having a second data quality score for the second set of classes that satisfy the data quality threshold, wherein creating the aggregated dataset from the first dataset and the second dataset comprises: determining a first set of clusters of records in the first dataset, wherein each cluster of records of the first set of clusters is labeled with a respective class of the first set of classes; determining a second set of clusters of records in the second dataset based on the second dataset, wherein each cluster of the second set of clusters is labeled with a respective class of the second set of classes; determining a set of clustering analysis scores based on distances between records of a first cluster of the first set of clusters and records of a second cluster of the second set of clusters in a feature space of the shared features; and in response to a determination that the set of clustering analysis scores satisfies a class update threshold, generating a relabeling indication for a set of records of the first dataset associated with the set of clustering analysis scores.
10. The method of any of embodiments 1 to 9, further comprising: updating the set of records associated with the relabeling indication, wherein updating the set of records comprises labeling the set of records with a second class associated with the second set of clusters.
11. The method any of embodiments 1 to 10, wherein: determining the set of clustering analysis scores comprises determining a first value based on inter-cluster distances, wherein each distance of the inter-cluster distances is a distance between a record of the first cluster and a record of the second cluster; and the method further comprising: determining a second value based on intra-cluster distances between records of the first cluster; determining the class update threshold based on the second value.
12. The method any of embodiments 1 to 11, wherein the set of clustering analysis scores is a first set of clustering analysis scores, the method further comprising: obtaining a third dataset comprising features that are shared with the first dataset, wherein each record of the third dataset is labeled with at least one class of a third set of classes, wherein the third set of classes is different from the second set of classes and from the first set of classes; determining a third set of clusters based on the third dataset, wherein each respective cluster of the third set of clusters is associated with a respective class of the third set of classes; determining a second set of clustering analysis scores based on distances between records of a second cluster of the second set of clusters and records of a third cluster of the third set of clusters in the feature space; and updating the second dataset by: in response to a determination that the second set of clustering analysis scores satisfies the class update threshold, relabeling a set of records of the second dataset associated with the second set of clustering analysis scores; and adding the third dataset to the second dataset.
13. The method any of embodiments 1 to 12, wherein the second cluster is associated with a second class, further comprising: generating a synthesized class associated with the second class; and updating the set of records indicated with the relabeling indication by labeling the set of records the set of records with the synthesized class.
14. The method of embodiment 13, further comprising: training a first instance of a machine learning model based on the first dataset; training a second instance of the machine learning model based on the aggregated dataset; and providing an input record to the second instance of the machine learning model, wherein the machine learning model outputs the synthesized class based on the input record.
15. The method any of embodiments 1 to 14, wherein the distance is a first distance, wherein: determining the first distance comprises determining a plurality of distances between the first record and a plurality of other records, wherein a first subset of the plurality of distances comprises the second record, and wherein a second subset of the plurality of distances comprises a second distance between the first record and a third record of a third cluster of the first set of clusters in the feature space; wherein determining the set of clustering analysis scores comprises determining a first subset of clustering analysis scores based on the first subset of the plurality of distances and a second subset of clustering analysis scores based on the second subset of the plurality of distances; and generating the relabeling indication for the set of records comprises comparing the first subset of clustering analysis scores and the second subset of clustering analysis scores to select the second cluster.
16. The method any of embodiments 1 to 15, wherein obtaining the second dataset comprises: obtaining a candidate dataset; determining whether records of the candidate dataset were labeled before records of the first dataset; and based on a determination that the records of the candidate dataset were labeled before records of the first dataset, using the candidate dataset as the second dataset.
17. The method any of embodiments 1 to 16, wherein the distance between the first cluster and the second cluster comprises a Manhattan distance.
18. The method any of embodiments 1 to 17, wherein determining the set of clustering analysis scores comprises: determining a first value based on a set of intra-cluster distances between records of the first cluster; determining a second value based on an inter-cluster distance between the first cluster and the second cluster; and determining a score of the set of clustering analysis scores based on a ratio of the first value and the second value.
19. The method any of embodiments 1 to 18, wherein a sum of the first set of classes and the second set of classes is greater than 100.
20. The method of any of embodiments 1 to 19, wherein: a first subset of records of the first dataset is labeled with a first class of the first set of classes; and determining the first set of clusters comprises: selecting a set of seed records of the first subset of records; determining a set of neighboring records of the set of seed records using a density-based algorithm; and labeling the set of neighboring records with the first class.
21. The method of any of embodiments 1 to 20, wherein: a first subset of records of the first dataset is labeled with a first class of the first set of classes; and determining the first set of clusters comprises: assigning each record of the first subset of records to an initial cluster; determining a first clustering analysis score based on the initial cluster; splitting the initial cluster into a first candidate cluster and a second candidate cluster using a bisecting k-means method, a bisecting x-means method, or a bisecting g-means method; determining a second clustering analysis score based on the first candidate cluster and the second candidate cluster; determining a comparison value based on the first clustering analysis score and the second clustering analysis score; and based on a determination that the comparison value satisfies a set of splitting criteria, setting the first candidate cluster as the first cluster and the second candidate cluster as a third cluster, wherein both the first cluster and the third cluster are labeled with the first class.
22. The method of any of embodiments 1 to 21, wherein: the first dataset comprises a first subset of records and a second subset of records; the first subset of records is labeled with the first class; the first cluster comprises the first subset of records; the second subset of records is labeled with a second class; a third cluster comprises the second subset of records; and the method further comprising: determining that the first class and the second class are associated with a third class representing a category encompassing the first class and the second class; and labeling the first cluster and the second cluster with the third class.
23. The method of embodiment 22, wherein the indication is a first indication, and wherein the distance is a first distance, the method further comprising: determining a third threshold based on the first distance; determining whether a second distance between the second cluster and the third cluster satisfies the third threshold; based on a determination that the second distance satisfies the third threshold, generate a second indication for the set of records, wherein the second indication is associated with the third class.

24. The method of any of embodiments 1 to 23, wherein a count of the shared features is greater than ten.

25. The method of any of embodiments 1 to 24, wherein a count of features of the second dataset is greater than a count of features of the first dataset.

26. The method of any of embodiments 1 to 25, the method further comprising: training a first instance of a machine learning model based on the first dataset, wherein obtaining the second dataset comprises: receiving a feedback message indicating that an accuracy of the machine learning model is less than an accuracy threshold; sending a query comprising a dataset parameter of the first dataset; and obtaining the second dataset based on the query; and training a second instance of the machine learning model based on the aggregated dataset.

27. One or more tangible, non-transitory, machine-readable media storing instructions that, when executed by a set of processors, cause the set of processors to effectuate operations comprising those of any of embodiments 1-26.

28. A system comprising: a set of processors; and memory storing computer program instructions that, when executed by the set of processors, cause the set of processors to effectuate operations comprising those of any of embodiments 1-26.

What is claimed is:

1. A system for evolving datasets to reduce time-based labeling deterioration based on distances between records of clusters, the system comprising a computer system comprising:
one or more processors programmed with computer program instructions that, when executed, cause the computer system to perform operations comprising:
obtaining a first dataset used to train a first machine learning model configured to generate class predictions from a first set of classes, wherein each record of the first dataset is labeled with at least one class of the first set of classes, the first dataset having a first data quality score for the first set of classes that satisfies a data quality threshold;
obtaining a second dataset comprising shared features, the shared features being shared with the first dataset, wherein each record of the second dataset is labeled with at least one class of a second set of classes, at least one record of the second dataset being labeled with a new class included in the second set of classes and not included in the first set of classes;
creating, from the first dataset and the second dataset, an aggregated dataset for training a second machine learning model to be configured to generate class predictions for the second set of classes, the aggregated dataset having a second data quality score for the second set of classes that satisfy the data quality threshold, wherein creating the aggregated dataset from the first dataset and the second dataset comprises:
determining a first set of clusters of records in the first dataset, wherein each cluster of records of the first set of clusters is labeled with a respective class of the first set of classes;
determining a second set of clusters of records in the second dataset based on the second dataset, wherein each cluster of the second set of clusters is labeled with a respective class of the second set of classes;
determining a set of clustering analysis scores based on distances between records of a first cluster of the first set of clusters and records of a second cluster of the second set of clusters in a feature space of the shared features, wherein the first cluster is associated with a first class, and wherein the second cluster is associated with a second class; and
in response to a determination that the set of clustering analysis scores satisfies a class update threshold, generating a relabeling indication for a set of records of the first dataset associated with the set of clustering analysis scores;
generating a synthesized class associated with the second class; and
updating the set of records indicated with the relabeling indication by labeling the set of records with the synthesized class.

2. The system of claim 1, wherein updating the set of records comprises labeling the set of records with the second class.

3. The system of claim 1, wherein:
determining the set of clustering analysis scores comprises determining a first value based on inter-cluster distances, wherein each distance of the inter-cluster distances is a distance between a record of the first cluster and a record of the second cluster; and
the operations further comprising:
determining a second value based on intra-cluster distances between records of the first cluster; and
determining the class update threshold based on the second value.

4. The system of claim 1, wherein the set of clustering analysis scores is a first set of clustering analysis scores, the operations further comprising:
obtaining a third dataset comprising features that are shared with the first dataset, wherein each record of the third dataset is labeled with at least one class of a third set of classes, wherein the third set of classes is different from the second set of classes and from the first set of classes;
determining a third set of clusters based on the third dataset, wherein each respective cluster of the third set of clusters is associated with a respective class of the third set of classes;
determining a second set of clustering analysis scores based on distances between records of a second cluster of the second set of clusters and records of a third cluster of the third set of clusters in the feature space; and
updating the second dataset by:
in response to a determination that the second set of clustering analysis scores satisfies the class update threshold, relabeling a set of records of the second dataset associated with the second set of clustering analysis scores; and
adding the third dataset to the second dataset.

5. A method comprising:
obtaining, with one or more processors, a first dataset associated with a first set of classes, wherein each record of the first dataset is labeled with at least one class of the first set of classes;
obtaining, with the one or more processors, a second dataset comprising shared features that are shared with the first dataset, wherein each record of the second dataset is labeled with at least one class of a second set of classes, at least one record of the second dataset being labeled with a new class included in the second set of classes and not included in the first set of classes;

creating, with the one or more processors, an aggregated dataset based on the first dataset and the second dataset, the aggregated dataset having a data quality score for the second set of classes that satisfy a data quality threshold, wherein creating the aggregated dataset from the first dataset and the second dataset comprises:

determining a first set of clusters of records in the first dataset, wherein each cluster of records of the first set of clusters is labeled with a respective class of the first set of classes;

determining a second set of clusters of records in the second dataset based on the second dataset, wherein each cluster of the second set of clusters is labeled with a respective class of the second set of classes;

determining a distance based on a first record of a first cluster of the first set of clusters and a second record of a second cluster of the second set of clusters in a feature space of the shared features, wherein the first cluster is associated with a first class, and wherein the second cluster is associated with a second class;

determining a set of clustering analysis scores based on the distance; and generating, based on the set of clustering analysis scores satisfying a class update threshold, a relabeling indication for a set of records of the first dataset associated with the set of clustering analysis scores;

generating a synthesized class associated with the second class; and updating the set of records indicated with the relabeling indication by labeling the set of records with the synthesized class.

6. The method of claim 5, further comprising:
training a first instance of a machine learning model based on the first dataset;
training a second instance of the machine learning model based on the aggregated dataset; and
providing an input record to the second instance of the machine learning model, wherein the machine learning model outputs the synthesized class based on the input record.

7. The method of claim 5, wherein the distance is a first distance, wherein:
determining the first distance comprises determining a plurality of distances between the first record and a plurality of other records, wherein a first subset of the plurality of distances comprises the second record, and wherein a second subset of the plurality of distances comprises a second distance between the first record and a third record of a third cluster of the first set of clusters in the feature space;
wherein determining the set of clustering analysis scores comprises determining a first subset of clustering analysis scores based on the first subset of the plurality of distances and a second subset of clustering analysis scores based on the second subset of the plurality of distances; and
generating the relabeling indication for the set of records comprises comparing the first subset of clustering analysis scores and the second subset of clustering analysis scores to select the second cluster.

8. The method of claim 5, wherein obtaining the second dataset comprises:
obtaining a candidate dataset;
determining whether records of the candidate dataset were labeled before records of the first dataset; and based on a determination that the records of the candidate dataset were labeled before records of the first dataset, using the candidate dataset as the second dataset.

9. The method of claim 5, wherein the distance between the first cluster and the second cluster comprises a Manhattan distance.

10. The method of claim 5, wherein determining the set of clustering analysis scores comprises:
determining a first value based on a set of intra-cluster distances between records of the first cluster;
determining a second value based on an inter-cluster distance between the first cluster and the second cluster; and
determining a score of the set of clustering analysis scores based on a ratio of the first value and the second value.

11. The method of claim 5, wherein a sum of the first set of classes and the second set of classes is greater than 100.

12. A set of non-transitory, machine-readable media storing program instructions that, when executed by a set of processors, causes the set of processors to perform operations comprising:
obtaining a first dataset associated with a first set of classes, wherein each record of the first dataset is labeled with at least one class of the first set of classes;
obtaining a second dataset comprising shared features that are shared with the first dataset, wherein each record of the second dataset is labeled with at least one class of a second set of classes, and wherein at least one record of the second dataset being labeled with a new class included in the second set of classes and not included in the first set of classes;
creating, from the first dataset and the second dataset, an aggregated dataset, the aggregated dataset having a data quality score for the second set of classes that satisfy a first threshold, wherein creating the aggregated dataset from the first dataset and the second dataset comprises:
determining a first set of clusters of records in the first dataset, wherein each cluster of records of the first set of clusters is labeled with a respective class of the first set of classes;
determining a second set of clusters of records in the second dataset based on the second dataset, wherein each cluster of the second set of clusters is labeled with a respective class of the second set of classes;
determining a distance based on a first record of a first cluster of the first set of clusters and a second record of a second cluster of the second set of clusters in a feature space of the shared features, wherein the first cluster is associated with a first class, and wherein the second cluster is associated with a second class;
determining a set of clustering analysis scores based on the distance; and
generating, based on the set of clustering analysis scores satisfying a second threshold, an indication for a set of records of the first dataset associated with the set of clustering analysis scores;
generating a synthesized class associated with the second class; and
updating the set of records indicated with the indication by labeling the set of records with the synthesized class.

13. The set of non-transitory, machine-readable media of claim 12, wherein:
a first subset of records of the first dataset is labeled with the first class; and
determining the first set of clusters comprises:

selecting a set of seed records of the first subset of records;

determining a set of neighboring records of the set of seed records using a density-based algorithm; and labeling the set of neighboring records with the first class.

14. The set of non-transitory, machine-readable media of claim 12, wherein:

a first subset of records of the first dataset is labeled with the first class; and determining the first set of clusters comprises:

assigning each record of the first subset of records to an initial cluster;

determining a first clustering analysis score based on the initial cluster;

splitting the initial cluster into a first candidate cluster and a second candidate cluster using a bisecting k-means method, a bisecting x-means method, or a bisecting g-means method;

determining a second clustering analysis score based on the first candidate cluster and the second candidate cluster; determining a comparison value based on the first clustering analysis score and the second clustering analysis score; and based on a determination that the comparison value satisfies a set of splitting criteria, setting the first candidate cluster as the first cluster and the second candidate cluster as a third cluster, wherein both the first cluster and the third cluster are labeled with the first class.

15. The set of non-transitory, machine-readable media of claim 12, wherein:

the first dataset comprises a first subset of records and a second subset of records;

the first subset of records is labeled with the first class;

the first cluster comprises the first subset of records;

the second subset of records is labeled with a second class;

a third cluster comprises the second subset of records; and the operations further comprise:

determining that the first class and the second class are associated with a third class representing a category encompassing the first class and the second class; and labeling the first cluster and the second cluster with the third class.

16. The set of non-transitory, machine-readable media of claim 15, wherein the indication is a first indication, and wherein the distance is a first distance, the operations further comprising:

determining a third threshold based on the first distance;

determining whether a second distance between the second cluster and the third cluster satisfies the third threshold;

based on a determination that the second distance satisfies the third threshold, generate a second indication for the set of records, wherein the second indication is associated with the third class.

17. The set of non-transitory, machine-readable media of claim 12, wherein a count of the shared features is greater than ten.

18. The set of non-transitory, machine-readable media of claim 12, wherein a count of features of the second dataset is greater than a count of features of the first dataset.

19. The set of non-transitory, machine-readable media of claim 12, the operations further comprising:

training a first instance of a machine learning model based on the first dataset, wherein obtaining the second dataset comprises:

receiving a feedback message indicating that an accuracy of the machine learning model is less than an accuracy threshold;

sending a query comprising a dataset parameter of the first dataset; and obtaining the second dataset based on the query; and training a second instance of the machine learning model based on the aggregated dataset.

* * * * *